United States Patent
Nagai et al.

(10) Patent No.: US 12,249,709 B2
(45) Date of Patent: Mar. 11, 2025

(54) POSITIVE ELECTRODE COMPOSITION FOR LITHIUM ION SECONDARY BATTERY, POSITIVE ELECTRODE FOR LITHIUM ION SECONDARY BATTERY, AND LITHIUM ION SECONDARY BATTERY

(71) Applicant: Denka Company Limited, Tokyo (JP)

(72) Inventors: Tatsuya Nagai, Chiba (JP); Shinichiro Osumi, Tokyo (JP); Tetsuya Ito, Chiba (JP)

(73) Assignee: Denka Company Limited, Tokyo (JP)

( * ) Notice: Subject to any disclaimer, the term of this patent is extended or adjusted under 35 U.S.C. 154(b) by 535 days.

(21) Appl. No.: 17/047,384

(22) PCT Filed: Apr. 26, 2019

(86) PCT No.: PCT/JP2019/017989
§ 371 (c)(1),
(2) Date: Oct. 13, 2020

(87) PCT Pub. No.: WO2019/216275
PCT Pub. Date: Nov. 14, 2019

(65) Prior Publication Data
US 2021/0119206 A1    Apr. 22, 2021

(30) Foreign Application Priority Data
May 8, 2018    (JP) ................. 2018-090074

(51) Int. Cl.
*H01M 4/525*    (2010.01)
*H01M 4/02*    (2006.01)
(Continued)

(52) U.S. Cl.
CPC ........... *H01M 4/525* (2013.01); *H01M 4/131* (2013.01); *H01M 4/133* (2013.01); *H01M 10/0525* (2013.01); *H01M 2004/028* (2013.01)

(58) Field of Classification Search
None
See application file for complete search history.

(56) References Cited

U.S. PATENT DOCUMENTS 10,087,330 B2 * 10/2018 Green .................. C09D 11/324
12,015,143 B2 * 6/2024 Kim ..................... H01M 10/052
(Continued)

FOREIGN PATENT DOCUMENTS

| EP | 2034542 A1 | 3/2009 |
|----|------------|--------|
| JP | H11176446 A | 7/1999 |

(Continued)

OTHER PUBLICATIONS

Wang et al., The study of carbon nanotubes as conductive additives of cathode in lithium ion batteries, J. Solid State Electrochem., 2011,15:759-764. (Year: 2011).*
(Continued)

*Primary Examiner* — Brian R Ohara
*Assistant Examiner* — M. T. Leonard
(74) *Attorney, Agent, or Firm* — Caesar Rivise, PC

(57) ABSTRACT

A positive electrode composition for a lithium ion secondary battery includes an active material that can occlude and release lithium ions and a conductive material, wherein the active material is a lithium cobalt composite oxide; the conductive material is carbon black and carbon nanotubes; the carbon black has a BET specific surface area of 100 to 400 $m^2/g$ and a DBP absorption amount of 210 to 400 ml/100 g; the carbon nanotubes have an average diameter of 20 nm or less, a BET specific surface area of 170 $m^2/g$ or more, and an aspect ratio of 50 or more; and a carbon black content X (unit: % by mass) and a carbon nanotube content Y (unit: % by mass) in the positive electrode composition satisfy the following conditions (A) and (B): (A) $0.5 \leq (X+Y) \leq 2.0$; (B) $0.80 \leq \{X/(X+Y)\} \leq 0.95$.

7 Claims, 1 Drawing Sheet

(51) Int. Cl.
H01M 4/131 (2010.01)
H01M 4/133 (2010.01)
H01M 10/0525 (2010.01)

(56) References Cited

U.S. PATENT DOCUMENTS

| | | | |
|---|---|---|---|
| 2010/0140554 A1* | 6/2010 | Oki | H01M 4/625 252/500 |
| 2010/0230641 A1 | 9/2010 | Oki et al. | |
| 2012/0171566 A1 | 7/2012 | Yoshitake et al. | |
| 2015/0004486 A1* | 1/2015 | Moroishi | H01M 10/0525 252/182.1 |
| 2015/0171421 A1 | 6/2015 | Akikusa et al. | |
| 2016/0141618 A1 | 5/2016 | Lim et al. | |
| 2017/0288218 A1 | 10/2017 | Horikoshi et al. | |
| 2019/0198879 A1 | 6/2019 | Nagai et al. | |
| 2019/0248944 A1 | 8/2019 | Nagai et al. | |

FOREIGN PATENT DOCUMENTS

| | | | | |
|---|---|---|---|---|
| JP | 2001126733 A | | 5/2001 | |
| JP | 2007080652 A | | 3/2007 | |
| JP | 2010238575 A | | 10/2010 | |
| JP | 2015115106 A | * | 6/2015 | ......... H01M 10/052 |
| JP | 2017182989 A | | 10/2017 | |
| KR | 10-20150067049 A | | 6/2015 | |
| WO | 2013179909 A1 | | 12/2013 | |
| WO | 2014051067 A1 | | 4/2014 | |
| WO | 2016024525 A1 | | 2/2016 | |
| WO | WO-2017099481 A1 | * | 6/2017 | ......... H01M 10/052 |
| WO | 2018021073 A1 | | 2/2018 | |
| WO | 2018047454 A1 | | 3/2018 | |

OTHER PUBLICATIONS

Plastics Additives—An Industrial Guide (3rd Edition), vol. 2, Section 14 Pigments, Colorants, and Dyes, p. 77, 79 (Year: 2002).*
Khodabakhshi et al. [Carbon 162 604-649]. (Year: 2020).*
Machine translation of WO2017099481A1 (Year: 2025).*
International Search Report for PCT/JP2019/017989, mailed Jul. 2, 2019.
English-language translation for JPH11176446 (1999).
English-language translation for JP2001126733 (2001).
English-language translation for JP2007080652 (2007).
English-language abstract for JP2010238575 (2010).
English-language abstract for JP2017182989 (2017).
English Translation for KR 10-20150067049 A (2015).
Extended European Search Report dated Apr. 26, 2021.

* cited by examiner

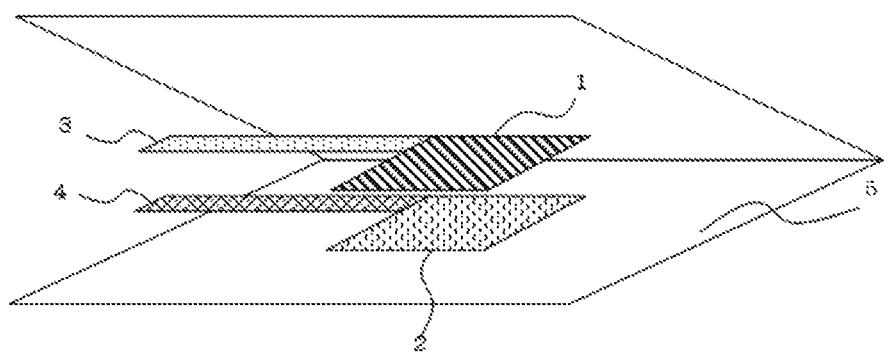

POSITIVE ELECTRODE COMPOSITION FOR LITHIUM ION SECONDARY BATTERY, POSITIVE ELECTRODE FOR LITHIUM ION SECONDARY BATTERY, AND LITHIUM ION SECONDARY BATTERY

CROSS-REFERENCE TO RELATED APPLICATIONS

This application is a U.S. National Phase Application of PCT/JP2019/017989, filed Apr. 26, 2019, which claims priority to JP 2018-090074, filed May 8, 2018, the contents of which applications are incorporated herein by reference in their entireties for all purposes.

FIELD OF THE INVENTION

The present invention relates to a positive electrode composition for a lithium ion secondary battery, a positive electrode for a lithium ion secondary battery, and a lithium ion secondary battery.

BACKGROUND OF THE INVENTION

Due to serious environment mental and energy problems, technologies for the realization of a low-carbon society that reduces dependency on fossil fuels are being actively developed. Examples of such technological development include the development of low-emission vehicles such as hybrid electric vehicles and electric vehicles, the development of renewable energy power generation and power storage systems such as solar power generation and wind power generation, the development of a next-generation power grid that efficiently supplies power and reduces power transmission loss, which extends to a wide variety.

One of the key devices commonly required for these technologies is a battery, and such a battery is required to have a high energy density for miniaturizing the system. In addition, high output characteristics are required to enable stable power supply regardless of the operating environment temperature. Further, good cycle characteristics that can withstand long-term use are also required. Therefore, the replacement of conventional lead-acid batteries, nickel-cadmium batteries, and nickel-hydrogen batteries with lithium ion secondary batteries which has higher energy density, output characteristics, and cycle characteristics is rapidly progressing.

A basic configuration of such a lithium ion secondary battery is composed of a positive electrode, a negative electrode, a separator, and an electrolyte. The positive electrode is generally composed of a positive electrode active material such as a lithium composite oxide, a conductive material, a positive electrode composition containing a binder, and a metal (such as aluminum) foil current collector. As the conductive material, a particulate carbon material such as carbon black is generally used.

By the way, carbon black has a configuration which primary particles close to a sphere shape are connected in a rosary-like shape as a common configuration thereof, and such a configuration is called a structure. The length of the structure is indirectly evaluated using the DBP absorption amount measured in accordance with JIS K6217-4. Generally, when the DBP absorption amount becomes larger, the structure becomes longer, resulting better effect of imparting conductivity, and more excellent liquid retention property, which is the ability to retain non-aqueous electrolyte solutions.

In recent years, further improvement of the energy density of such lithium ion secondary battery has been required. Therefore, it is required to reduce the content of the conductive material, which is a component that does not contribute to the charge/discharge capacity in the electrode, and increase the content of the active material. As a means for solving this problem, there has been proposed a technique for using fibrous carbon material, which has a higher aspect ratio than particulate carbon material such as carbon black and can impart conductivity with a smaller amount of addition, in combination with carbon black.

Patent Literature 1 discloses a technique in which a carbon nanofiber electrically bridges an active material and carbon black to create a good conductive path in an electrode and a battery having excellent cycle characteristics is obtained. However, when carbon black having a smaller particle diameter and a longer structure, which can impart conductivity with a smaller amount of addition, is used, sufficient conductive paths cannot be formed and the content of the active material cannot be increased, which is a problem.

Patent Literature 2 discloses a technique for obtaining a battery having excellent output characteristics by preventing the conductive material from being unevenly distributed in the electrodes by using carbon black and carbon nanotubes in combination. Further, in Patent Literature 3, there is disclosed a technique for obtaining batteries with excellent cycle characteristics and output characteristics by setting the proportion of fibrous carbon material to 1 to 20% by weight and the proportion of granular carbon material to 99 to 80% by weight when the entire conductive material is 100% by weight so as to improve the conductivity in the electrode. However, since the technique is based on the premise that a large amount of conductive material is added in both inventions, there has been a problem that the content of the active material cannot be increased.

Patent Literature 4 discloses a technique for obtaining a battery having excellent output characteristics and cycle characteristics by stabilizing the conductive paths in the positive electrode by using carbon black and graphitized carbon fiber in combination. Further, Patent Literature 5 discloses a technique for obtaining a battery having low resistance and excellent discharge capacity and cycle characteristics by using carbon black and fibrous carbon in combination. However, in both inventions, since the fiber diameter of the fibrous carbon material used is large, it is necessary to add a large amount of the fibrous carbon material in order to form sufficient conductive paths, and the proportion of carbon black used in combination will be reduced. As a result, there has been a problem that retaining a sufficient electrolytic solution in the vicinity of the active material is impossible, and sufficient output characteristics cannot be obtained when used in a low temperature environment.

CITATION LIST

Patent Literature

[Patent Literature 1] WO 2013/179909
[Patent Literature 2] Japanese Unexamined Patent Publication No. 2007-80652
[Patent Literature 3] Japanese Patent Publication No. 11-176446
[Patent Literature 4] Japanese Patent Publication No. 2001-126733

[Patent Literature 5] Japanese Patent Publication No. 2010-238575

SUMMARY OF THE INVENTION

In view of the above problems and circumstances, the object of the present invention is to provide a positive electrode composition for a lithium ion secondary battery capable of easily obtaining a lithium ion secondary battery having high energy density, low internal resistance, and excellent output characteristics, cycle characteristics, and low temperature characteristics.

As a result of diligent research, the present inventors have found that the above problems can be solved by using carbon black with a small particle diameter and a long structure and carbon nanotubes with a small fiber diameter and a specific BET specific surface area and aspect ratio as the conductive materials for a specific active material.

Specifically, according to the present invention, a positive electrode composition for lithium ion secondary battery comprises lithium cobalt oxide as an active material, carbon black with a small particle diameter and a long structure, and carbon nanotubes with a small fiber diameter and a specific BET specific surface area and aspect ratio as a conductive material. A lithium ion secondary battery manufactured by using such a positive electrode composition for a lithium ion secondary battery has a high energy density, a low internal resistance, and is excellent in output characteristics, cycle characteristics, and low temperature characteristics. The present invention is completed based on such findings.

Accordingly, the present invention is specified as follows.
(1) A positive electrode composition for a lithium ion secondary battery, comprising an active material that can occlude and release lithium ions and a conductive material, wherein
the active material is a lithium cobalt composite oxide;
the conductive material is carbon black and carbon nanotubes;
the carbon black has a BET specific surface area of 100 to 400 $m^2/g$ and a DBP absorption amount of 210 to 400 ml/100 g;
the carbon nanotubes have an average diameter of 20 nm or less, a BET specific surface area of 170 $m^2/g$ or more, and an aspect ratio of 50 or more; and
a carbon black content X (unit: % by mass) and a carbon nanotube content Y (unit: % by mass) in the positive electrode composition satisfy the following conditions (A) and (B).

$0.5 \leq (X+Y) \leq 2.0$ (A)

$0.80 \leq \{X/(X+Y)\} \leq 0.95$ (B)

(2) The positive electrode composition for a lithium ion secondary battery according to (1), wherein the lithium cobalt composite oxide has an average particle diameter $D_{50}$ of 10 to 20 μm.
(3) The positive electrode composition for a lithium ion secondary battery according to (1) or (2), wherein the BET specific surface area of the carbon nanotubes is larger than 200 $m^2/g$.
(4) The positive electrode composition for a lithium ion secondary battery according to any one of (1) to (3), wherein the positive electrode composition for a lithium ion secondary battery comprises 96% by mass or more of the lithium cobalt composite oxide.
(5) A positive electrode for a lithium ion secondary battery comprising the positive electrode composition for a lithium ion secondary battery according to any one of (1) to (4).
(6) A lithium ion secondary battery comprising the positive electrode for a lithium ion secondary battery according to (5).

According to the present invention, it is possible to provide a positive electrode composition for a lithium ion secondary battery capable of easily obtaining a lithium ion secondary battery having high energy density, low internal resistance, and excellent output characteristics, cycle characteristics, and low temperature characteristics.

BRIEF DESCRIPTION OF THE DRAWINGS

FIG. 1 is a schematic perspective view showing the structure of a test battery used in Examples and Comparative Examples.

DETAILED DESCRIPTION OF THE INVENTION

Hereinafter, the present invention will be described in detail. The positive electrode composition for a lithium ion secondary battery according to the present invention comprises an active material and a conductive material, wherein the active material is a lithium cobalt composite oxide; the conductive material is carbon black and carbon nanotubes; the carbon black has a BET specific surface area of 100 to 400 $m^2/g$ and a DBP absorption amount of 210 to 400 ml/100 g; the carbon nanotubes have an average diameter of 20 nm or less, a BET specific surface area of 170 $m^2/g$ or more, and an aspect ratio of 50 or more.

As the lithium cobalt composite oxide which is the active material according to the present invention, for example, lithium cobalt oxide can be used. As the lithium cobalt oxide, those produced by conventionally known methods such as a solid phase method, a liquid phase method, and a vapor phase method may be used, similar to lithium cobalt oxide generally used as an active material for a battery. Further, active material whose surface is coated with a metal oxide such as $ZrO_2$, $Al_2O_3$, $TiO_2$, $SiO_2$, MgO, $TiO_2$, or $Li_2CO_3$, $AlF_3$ or the like also may be used. In addition to lithium cobalt oxide, other active materials may be included as long as the effects of the present invention are not impaired.

The average particle diameter $D_{50}$ of the lithium cobalt composite oxide such as lithium cobalt oxide according to the present invention is preferably 10 to 20 μm. By setting the average particle diameter in such a range, the filling rate of the active material in the obtained positive electrode is improved, and it becomes easy to obtain a positive electrode having a high energy density. Further, it becomes easy to bring out the features of the conductive material described later, and it becomes easy to obtain a high output battery with an extremely small amount of the conductive material added. Further, when the obtained battery is charged and discharged, the decomposition of the electrolytic solution is suppressed, and good cycle characteristics can be easily obtained. The average particle diameter according to the present invention is a value obtained by dispersing the positive electrode active material using ethanol as a dispersion medium and measuring it with a laser diffraction/scattering type particle diameter distribution measuring device in accordance with JIS Z8825. In addition, The content of the lithium cobalt composite oxide such as lithium cobalt oxide according to the present invention is preferably 96% by mass or more with respect to the positive electrode composition which may comprise the lithium cobalt oxide, the conductive material and a binder. With such a content, it becomes easy to obtain a battery having a sufficiently high energy density.

The conductive material according to the present invention is carbon black and carbon nanotubes. Carbon black is selected from acetylene black, furnace black, channel black, and the like, similar to carbon black generally used as conductive material for batteries. Of these, acetylene black, which has excellent crystallinity and purity, is preferable. In addition to carbon black and carbon nanotubes, other conductive materials may be included as long as the effects of the present invention are not impaired.

The BET specific surface area of the carbon black according to the present invention is 100 to 400 $m^2/g$. By setting the BET specific surface area to 100 $m^2/g$ or more, the number of electrical contacts with the active material and the current collector is increased, and a good conductivity-imparting effect can be obtained. Further, by setting the content to 400 $m^2/g$ or less, the interaction between the particles is suppressed, so that the particles are uniformly dispersed in the positive electrode active materials, and good conductive paths can be obtained. From this viewpoint, the BET specific surface area of the carbon black is more preferably 120 to 380 $m^2/g$. The BET specific surface area according to the present invention is a value measured by the static volume method in accordance with JIS Z 8830, using nitrogen as an adsorbent.

The DBP absorption amount of the carbon black according to the present invention is 210 to 400 ml/100 g. By setting the DBP absorption amount to 210 ml/100 g or more, when it is used as the conductive material, the structure has a sufficient length and spread, and a good conductive paths and liquid retention property of a non-aqueous electrolytic solutions can be obtained. Further, by setting the amount to 400 ml/100 g or less, aggregation due to entanglement between structures is suppressed, so that the structures are uniformly dispersed in the positive electrode active materials, so that it is possible to achieve both the formation of good conductive paths and sufficient liquid retention for non-aqueous electrolyte solutions. From this viewpoint, the DBP absorption amount of the carbon black is more preferably 250 to 320 ml/100 g. The DBP absorption amount according to the present invention is the value measured in accordance with JIS K6217-4.

The volume resistivity of carbon black according to the present invention is not particularly limited, but it is preferable that it is low from the viewpoint of conductivity. Specifically, the volume resistivity measured under 7.5 MPa compression is preferably 0.30 $\Omega \cdot cm$ or less, and more preferably 0.25 $\Omega \cdot cm$ or less.

The ash content and water content of carbon black according to the present invention are not particularly limited, but from the viewpoint of suppressing side reactions, it is preferable that both of them are small. Specifically, the ash content is preferably 0.04% by mass or less, and the water content is preferably 0.10% by mass or less.

For the carbon nanotubes according to the present invention, the average diameter is 20 nm or less, the BET specific surface area is 170 $m^2/g$ or more, and the aspect ratio is 50 or more. By setting the average diameter to 20 nm or less and the BET specific surface area to 170 $m^2/g$ or more, the number of electrical contacts with the surface of the active material is increased, and good conductive paths can be obtained. From this viewpoint, it is more preferable that the average diameter of the carbon nanotubes is 15 nm or less and the BET specific surface area is larger than 200 $m^2/g$. Further, by setting the aspect ratio to 50 or more, it is possible to efficiently form conductive paths with few interruptions on the surface of the active material. From this point of view, the aspect ratio of the carbon nanotubes is more preferably 100 or more. The average diameter and aspect ratio according to the present invention are shapes measured by an image analysis method using a transmission electron microscope, a reflection electron microscope, an optical microscope, or the like. Specifically, they are sizes represented by the average value of 20 carbon nanotubes. In addition, the aspect ratio is the ratio of average length/average diameter. Further, the BET specific surface area according to the present invention is a value measured by the static volume method in accordance with JIS Z 8830, using nitrogen as an adsorbent.

The carbon black content X (unit: % by mass) and the carbon nanotube content Y (unit: % by mass) according to the present invention satisfy $0.5 \leq (X+Y) \leq 2.0$ and $0.80 \leq \{X/(X+Y)\} \leq 0.95$. By setting $0.5 \leq (X+Y) \leq 2.0$, a sufficient effect of imparting conductivity can be obtained while keeping the content of the conductive material, which is a component that does not contribute to the charge/discharge capacity, low in the positive electrode composition. Further, by setting $0.80 \leq \{X/(X+Y)\} \leq 0.95$, carbon black forms conductive paths between active materials in the positive electrode composition and retains a non-aqueous electrolytic solution in the vicinity of the active material, so that an electrode structure is formed in which carbon nanotubes play a role in forming conductive paths on the surface of the active material. The electrode thus obtained has both good conductive paths and ionic transport paths, and good battery characteristics can be obtained when used in a battery. From the above viewpoint, X+Y is more preferably 0.9 or more, and more preferably 1.3 or less.

The manufacturing of the positive electrode composition for a lithium ion secondary battery according the present invention is not particularly limited, and a conventionally known method can be used. For example, a solvent dispersion solution of a positive electrode active material, a conductive material, and a binder is obtained by mixing with a ball mill, sand mill, twin-screw kneader, rotating/revolving stirrer, planetary mixer, dispenser mixer, or the like, and is generally manufactured and used in the state of a dispersion liquid in which it is dispersed in a dispersion medium. As the positive electrode active material and the conductive material, those described above may be used. The carbon black and the carbon nanotubes may be put into a mixer separately or may be mixed in advance. Examples of the binder include polymers such as polyvinylidene fluoride, polytetrafluoroethylene, styrene-butadiene copolymer, polyvinyl alcohol, acrylonitrile-butadiene copolymer, carboxylic acid-modified (meth) acrylic acid ester copolymer, and the like. Of these, polyvinylidene fluoride is preferable in terms of oxidation resistance. Examples of the dispersion medium include water, N-methyl-2-pyrrolidone, cyclohexane, methyl ethyl ketone, methyl isobutyl ketone and the like. When polyvinylidene fluoride is used as a binder, N-methyl-2-pyrrolidone is preferable in terms of solubility.

In addition, the positive electrode composition for a lithium ion secondary battery according to the present invention may comprise components other than the positive electrode active material, the conductive material, and the binder as long as the effects of the present invention are not impaired. For example, polyvinylpyrrolidone, polyvinylimidazole, polyethylene glycol, polyvinyl alcohol, polyvinyl butyral, carboxymethyl cellulose, acetyl cellulose, carboxylic acid-modified (meth) acrylic acid ester copolymer, or the like may be comprised for the purpose of improving dispersibility.

The method for manufacturing a positive electrode for a lithium ion secondary battery according to the present invention is not particularly limited, and a conventionally known method for manufacturing a positive electrode may be used. For example, a positive electrode can be manufactured by the following method. That is, after the above-mentioned dispersion liquid is applied onto a metal (such as aluminum) foil current collector, the dispersion medium contained in the positive electrode composition according to the present invention is removed by heating, so that a positive electrode is obtained by forming a film of the positive electrode composition for a secondary battery on the surface of the current collector. Further, the target electrode can be obtained by pressing the current collector and an electrode mixture layer with a roll press or the like to bring them into close contact with each other.

The method for manufacturing the lithium ion secondary battery according to the present invention is not particularly limited, and a conventionally known method for manufacturing a secondary battery may be used, but for example, it can also be manufactured by the following method. That is, it can be made by arranging a polyolefin microporous membrane as an insulating layer between the positive electrode and the negative electrode, and injecting a non-aqueous electrolytic solution into the voids of the positive electrode, the negative electrode and the polyolefin microporous membrane until the non-aqueous electrolytic solution is sufficiently impregnated.

The lithium ion secondary battery according to the present invention is not particularly limited, but can be used in a wide range of fields, for example, portable AV devices such as digital cameras, video cameras, portable audio players, portable LCD TVs, mobile information terminals such as laptop computers, smartphones, mobile PCs, and portable game devices, electric tools, electric bicycles, hybrid vehicles, electric cars, power storage systems, and the like.

EXAMPLES

Hereinafter, the positive electrode composition for a lithium ion secondary battery according to the present invention will be described in detail with reference to Examples and Comparative Examples. However, the present invention is not limited to the following examples as long as the spirit of the present invention is not exceeded.

Example 1

(Positive Electrode Composition for Lithium Ion Secondary Battery)

Lithium cobalt oxide (manufactured by Yumicore, "KD-20") $LiCoO_2$ with an average particle diameter $D_{50}$ of 20 μm as an active material, and carbon black with a BET specific surface area of 370 $m^2/g$ and a DBP absorption amount of 310 ml/100 g (manufactured by Denka, "SAB", described as acetylene black-A in Table 1) and a N-Methylpyrrolidone dispersion of carbon nanotubes with an average diameter of 9 nm and a BET specific surface area of 243 $m^2/g$ (manufactured by CNano, "LB107") as conductive materials, are prepared. To the lithium cobalt oxide 98.4% by mass, the carbon black 0.76% by mass, and the carbon nanotubes with a dispersed mass of 0.04% by mass, a N-methylpyrrolidone solution of polyvinylidene fluoride as a binder with a dissolved mass of 0.8% by mass, and N-methylpyrrolidone as a dispersion medium, were added and mixed. A dispersion of a positive electrode composition for a lithium ion secondary battery was thus obtained.

(Positive Electrode for Lithium Ion Secondary Battery)

The dispersion liquid of the positive electrode composition for a lithium ion secondary battery was applied to an aluminum foil having a thickness of 20 μm using a baker type applicator, dried, and then pressed and cut to obtain a positive electrode for a lithium ion secondary battery.

(Negative Electrode for Lithium Ion Secondary Battery)

A negative electrode composition for a lithium ion secondary battery (graphite (manufactured by Shenzhen BTR, "AGP-2A") 95% by mass, carbon black (manufactured by Denka, "Li-400") 1.0% by mass, polyvinylidene fluoride 1.5% by mass, and styrene-butadiene copolymer 2.5% by mass) was applied to an copper foil having a thickness of 20 μm using a baker type applicator, dried, and then pressed and cut to obtain a positive electrode for a lithium ion secondary battery.

(Lithium Ion Secondary Battery)

The positive electrode, a separator, and the negative electrode were overlapped and laminated together, and then packed and pre-sealed with an aluminum laminate film, and then an electrolytic solution was injected, and battery formatting and vacuum sealing were performed to obtain a laminated lithium ion secondary battery. The laminated lithium ion secondary battery includes a positive electrode 1, a negative electrode 2, a positive electrode aluminum tab 3, a negative electrode nickel tab 4, and a polyolefin microporous membrane 5.

[Internal Resistance]

The prepared lithium ion secondary battery was charged/discharged for 5 cycles in a voltage range of 2.75 to 4.2 V, and then impedance analysis was performed in a frequency range of 10 MHz to 0.001 Hz and a vibration voltage of 5 mV. The internal resistance of this Example was 1.62Ω.

[Output Characteristics (Capacity Retention Rate at the Time of 3 C Discharge)]

The prepared lithium ion secondary battery was charged at a constant current constant voltage limited to 4.2 V and 0.2 C at 25° C., and then discharged to 2.75 V at a constant current of 0.2 C. Next, the discharge current was changed to 0.2 C and 3 C, and the discharge capacity for each discharge current was measured. Then, the capacity retention rate at the time of 3 C discharge with respect to the time of 0.2 C discharge was calculated. The capacity retention rate at the time of 3 C discharge in this Example was 96.8%.

[Cycle Characteristics (Cycle Capacity Retention Rate)]

The prepared lithium ion battery was charged at a constant current constant voltage limited to 4.2 V and 1 C at 25° C., and then discharged to 2.75 V at a constant current of 1 C. The charge and discharge cycles were repeated, and the ratio of the discharge capacity at the 500th cycle to the discharge capacity at the first cycle was obtained and used as the cycle capacity retention rate. The cycle capacity retention rate in this Example was 96.2%.

[Low Temperature Output Characteristics (Capacity Retention Rate when Discharged at −20° C.)]

The prepared lithium ion secondary battery was charged at a constant current constant voltage of 4.2 V and 0.2 C limit at 25° C., and then discharged to 2.75 V at a constant current of 0.5 C. Next, after charging with a constant current constant voltage limited to 4.2 V and 0.2 C at −20° C., the battery was discharged to 2.75 V at a constant current of 0.5 C. Then, the capacity retention rate at the time of −20° C. discharge with respect to the time of 25° C. discharge was calculated. The capacity retention rate at −20° C. discharge in this Example was 68.7%.

Example 2

The carbon black of Example 1 was changed to a carbon black having a BET specific surface area of 133 $m^2/g$ and a DBP absorption amount of 270 ml/100 g (manufactured by Denka, "Li-435", described as acetylene black-B in Table 1), and the content was changed to 0.9% by mass. The dispersed mass of the carbon nanotube dispersion was changed to 0.10% by mass, and the dissolved mass of the polyvinylidene fluoride solution was changed to 1.0% by mass. Except for these, a dispersion of a positive electrode composition for a lithium ion secondary battery, a positive electrode for a lithium ion secondary battery, and a lithium ion secondary battery were prepared in the same manner as in Example 1, and each evaluation was performed. The results are shown in Table 1.

Example 3

The active material of Example 2 was changed to lithium cobaltate (manufactured by Yumicore Co., Ltd., "KD-10") having an average particle diameter $D_{50}$ of 10 μm. The carbon black content was changed by 1.2% by mass. The carbon nanotubes were changed to a N-Methylpyrrolidone dispersion of carbon nanotubes with an average diameter of 15 nm and a BET specific surface area of 207 $m^2/g$ (manufactured by CNano, "LB100", listed as CNT-B in Table 1), and the dispersed mass was changed to 0.3% by mass. The dissolved mass of the polyvinylidene fluoride solution was changed to 1.5% by mass. Except for these, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

Example 4

The active material of Example 2 was changed to lithium cobaltate (manufactured by Nippon Kagaku Kogyo Co., Ltd., "Celseed C-5") having an average particle size $D_{50}$ of 5 μm. The carbon black content was changed to 1.8% by mass. The dispersed mass of the carbon nanotube dispersion was changed to 0.2% by mass, and the dissolved mass of the polyvinylidene fluoride solution was changed to 2.0% by mass. Except for these, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

Comparative Example 1

The content of the carbon black in Example 2 was changed to 2.0% by mass, the dispersed mass of the carbon nanotube dispersion was changed to 0% by mass, and the dissolved mass of the polyvinylidene fluoride solution was changed to 2.0% by mass. Except for these, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

Comparative Example 2

The content of the carbon black in Example 2 was changed to 0% by mass, the dispersed mass of the carbon nanotube dispersion was changed to 2.0% by mass, and the dissolved mass of the polyvinylidene fluoride solution was changed to 2.0% by mass. Except for these, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

Comparative Example 3

The content of the carbon black in Example 2 was changed to 0.7% by mass, the dispersed mass of the carbon nanotube dispersion was changed to 0.3% by mass. Except for these, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

Comparative Example 4

The carbon black of Example 2 was changed to a carbon black having a BET specific surface area of 58 $m^2/g$ and a DBP absorption amount of 200 ml/100 g (manufactured by Denka, "Li-250", described as acetylene black-C in Table 1). Except for this, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

Comparative Example 5

The carbon black of Example 2 was changed to a carbon black having a BET specific surface area of 877 $m^2/g$ and a DBP absorption amount of 390 ml/100 g (manufactured by Lion, "ECP", described as carbon black-A in Table 1), and the content was changed to 0.4% by mass. The dispersed mass of the carbon nanotube dispersion was changed to 1.6% by mass, and the dissolved mass of the polyvinylidene fluoride solution was changed to 2.0% by mass. Except for these, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

Comparative Example 6

The carbon black of Example 2 was changed to a carbon black having a BET specific surface area of 877 $m^2/g$ and a DBP absorption amount of 390 ml/100 g (manufactured by Lion, "ECP", described as carbon black-A in Table 1), and the content was changed to 0.9% by mass. The dispersed mass of the carbon nanotube dispersion was changed to 0.1% by mass, and the dissolved mass of the polyvinylidene fluoride solution was changed to 1.0% by mass. Except for these, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

Comparative Example 7

The carbon nanotubes of Example 2 were changed to carbon nanotubes having an average diameter of 25 nm and a BET specific surface area of 100 m$^2$/g (manufactured by Wako Chemical Co., Ltd., described as CNT-C in Table 1). Except for these, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

Comparative Example 8

The active material of Example 2 was changed to lithium nickel cobalt manganese composite oxide LiNi$_{0.5}$Mn$_{0.3}$Co$_{0.2}$O$_2$ (manufactured by Jiangxi Jiangte Lithium Battery Materials, "L532") having an average particle diameter D$_{50}$ of 8 μm. The content of the carbon black was changed to 1.8% by mass, the dispersed mass of the carbon nanotube dispersion was changed to 0.2% by mass, and the dissolved mass of the polyvinylidene fluoride solution was changed to 2.0% by mass. Except for these, a dispersion of a positive electrode composition for a lithium ion secondary battery, a positive electrode for a lithium ion secondary battery, and a lithium ion secondary battery were prepared in the same manner as in Example 2, and each evaluation was performed. The results are shown in Table 1.

From the results in Table 1, it can be understood that the lithium ion secondary batteries prepared by using the positive electrode compositions for a lithium ion secondary battery according to the present invention had a high energy density, a low internal resistance, and is excellent in output characteristics, cycle characteristics, and low temperature characteristics.

DESCRIPTION OF REFERENCE NUMERALS

1 . . . Positive electrode
2 . . . Negative electrode
3 . . . Positive electrode aluminum tab
4 . . . Negative electrode nickel tab
5 . . . Polyolefin microporous membrane

The invention claimed is:
1. A positive electrode composition for a lithium ion secondary battery, comprising an active material that can occlude and release lithium ions and a conductive material, wherein
the active material is a lithium cobalt composite oxide in which lithium and cobalt are the only metal components;

TABLE 1

| Material | Evaluation item | Example 1 | Example 2 | Example 3 | Example 4 | Comparative Example 1 | Comparative Example 2 |
|---|---|---|---|---|---|---|---|
| Active material | Type | LCO | LCO | LCO | LCO | LCO | LCO |
| | Particle diameter D50 (μm) | 20 | 20 | 10 | 5 | 20 | 20 |
| Carbon black | Type | Acetylene Black-A | Acetylene Black-B | Acetylene Black-B | Acetylene Black-B | Acetylene Black-B | — |
| | Specific surface area (m$^2$/g) | 370 | 133 | 133 | 133 | 133 | — |
| | DBP absorption amount (mL/100g) | 310 | 270 | 270 | 270 | 270 | — |
| Carbon nanotube | Type | CNT-A | CNT-A | CNT-B | CNT-A | — | CNT-A |
| | Average diameter (nm) | 9 | 9 | 15 | 9 | — | 9 |
| | BET Specific surface area (m$^2$/g) | 243 | 243 | 207 | 243 | — | 243 |
| | Aspect ratio | 50 or more | 50 or more | 50 or more | 50 or more | — | 50 or more |
| Evaluation | X + Y | 0.8 | 10 | 1.5 | 2.0 | 2.0 | 2.0 |
| | X/(X + Y) | 0.95 | 0.90 | 0.80 | 0.90 | 1.00 | 0 |
| | Active material ration (%) in positive electrode composition | 98.4 | 98.0 | 97.0 | 96.0 | 96.0 | 96.0 |
| | Internal resistance (Ω) | 1.62 | 1.56 | 1.82 | 2.35 | 3.26 | 3.67 |
| | Capacity retention rate (%) at time of 3 C discharge | 96.8 | 97.3 | 95.0 | 91.3 | 83.2 | 76.1 |
| | Cycle capacity retention rate (%) | 96.2 | 97.2 | 94.1 | 90.6 | 8S.3 | 90.5 |
| | Capacity retention rate (%) when discharged at −20° C. | 68.7 | 68.8 | 65.8 | 60.4 | 55.1 | 46.8 |

| Material | Evaluation item | Comparative Example 3 | Comparative Example 4 | Comparative Example 5 | Comparative Example 6 | Comparative Example 7 | Comparative Example 8 |
|---|---|---|---|---|---|---|---|
| Active material | Type | LCO | LCO | LCO | LCO | LCO | NMC |
| | Particle diameter D50 (μm) | 20 | 20 | 20 | 20 | 20 | 8 |
| Carbon black | Type | Acetylene Black-B | Acetylene Black-C | Carbon Black-A | Carbon Black-A | Acetylene Black-B | Acetylene Black-B |
| | Specific surface area (m$^2$/g) | 133 | 58 | 877 | 877 | 133 | 133 |
| | DBP absorption amount (mL/100 g) | 270 | 200 | 390 | 390 | 270 | 270 |
| Carbon nanotube | Type | CNT-A | CNT-A | CNT-A | CNT-A | CNT-C | CNT-A |
| | Average diameter (nm) | 9 | 9 | 9 | 9 | 25 | 9 |
| | BET Specific surface area (m$^2$/g) | 243 | 243 | 243 | 243 | 100 | 243 |
| | Aspect ratio | 50 or more | 50 or more | 50 or more | 50 or more | 40 | 50 or more |
| Evaluation | X + Y | 1.0 | 1.0 | 2.0 | 1.0 | 1.0 | 2.0 |
| | X/(X + Y) | 0.70 | 0.90 | 0.20 | 0.90 | 0.90 | 0.90 |
| | Active material ration (%) in positive electrode composition | 98.0 | 98.0 | 96.0 | 98.0 | 98.0 | 96.0 |
| | Internal resistance (Ω) | 3.42 | 4.34 | 5.39 | 3.47 | 4.72 | 4.6 |
| | Capacity retention rate (%) at time of 3 C discharge | 81.3 | 72.6 | 62.7 | 73.2 | 68.7 | 81.2 |
| | Cycle capacity retention rate (%) | 88.7 | 88.3 | 86.2 | 87.3 | 81.4 | 82.4 |
| | Capacity retention rate (%) when discharged at −20° C. | 52.6 | 51.8 | 47.3 | 50.8 | 53.1 | 50.3 | the conductive material is carbon black and carbon nanotubes, wherein the carbon black and the carbon nanotubes are separately dispersed in the active material;

all the carbon black comprised in the positive electrode composition has a BET specific surface area of 133 to 400 m$^2$/g and a DBP absorption amount of 210 to 400 ml/100 g;

the carbon nanotubes have an average diameter of 20 nm or less, a BET specific surface area of 170 m$^2$/g or more, and an aspect ratio of 50 or more, wherein the BET specific surface area of carbon black and the carbon nanotubes are measured separately; and a carbon black content X (unit: % by mass) and a carbon nanotube content Y (unit: % by mass) in the positive electrode composition satisfy the following conditions (A) and (B):

$$0.5 \leq (X+Y) \leq 2.0 \quad (A)$$

$$0.80 \leq \{X/(X+Y)\} \leq 0.95. \quad (B)$$

2. The positive electrode composition for a lithium ion secondary battery according to claim 1, wherein the lithium cobalt composite oxide has an average particle diameter D$_{50}$ of 10 to 20 μm.

3. The positive electrode composition for a lithium ion secondary battery according to claim 1, wherein the BET specific surface area of the carbon nanotubes is larger than 200 m$^2$/g.

4. The positive electrode composition for a lithium ion secondary battery according to claim 1, wherein the positive electrode composition for a lithium ion secondary battery comprises 96% by mass or more and lower than 99.5% by mass of the lithium cobalt composite oxide.

5. A positive electrode for a lithium ion secondary battery comprising the positive electrode composition for a lithium ion secondary battery according to claim 1.

6. A lithium ion secondary battery comprising the positive electrode for a lithium ion secondary battery according to claim 5.

7. The positive electrode composition for a lithium ion secondary battery according to claim 1, wherein the carbon black forms conductive paths between the active material, and the carbon nanotubes form conductive paths on a surface of the active material.

* * * * *